United States Patent [19]

Kaplan

[11] Patent Number: 5,257,340
[45] Date of Patent: Oct. 26, 1993

[54] LINEAR COATED CORE/CLAD LIGHT SOURCE/COLLECTOR

[75] Inventor: Martin C. Kaplan, Rochester, N.Y.
[73] Assignee: Eastman Kodak Company, Rochester, N.Y.
[21] Appl. No.: 891,895
[22] Filed: Jun. 1, 1992
[51] Int. Cl.⁵ .................... G02B 6/02; F21V 7/04; G03G 15/04
[52] U.S. Cl. .................... 385/128; 385/123; 385/147; 385/901; 362/32; 355/228; 355/229
[58] Field of Search .......... 385/31, 38, 123, 124, 385/127, 128, 141, 142, 144, 147, 901; 362/32; 355/1, 228, 229; 250/227.11

[56] References Cited

U.S. PATENT DOCUMENTS

| | | | |
|---|---|---|---|
| 3,101,411 | 8/1963 | Richards | 250/83.3 |
| 4,128,332 | 12/1978 | Rowe | 355/67 |
| 4,186,431 | 1/1980 | Engel et al. | 362/223 |
| 4,314,283 | 2/1982 | Kramer | 358/294 |
| 4,321,630 | 3/1982 | Kramer | 358/294 |
| 4,336,993 | 6/1982 | Banton | 385/128 X |
| 4,371,897 | 2/1983 | Kramer | 358/294 |
| 4,376,576 | 3/1983 | Snelling | 385/128 X |
| 4,710,624 | 12/1987 | Alvarez et al. | 250/228 |
| 4,733,332 | 3/1988 | Yamashita et al. | 362/32 |
| 4,797,711 | 1/1989 | Sasada et al. | 355/32 |
| 4,822,123 | 4/1989 | Mori | 385/31 X |
| 4,868,383 | 9/1989 | Kurtz et al. | 250/228 |
| 4,899,040 | 2/1990 | Davis et al. | 250/216 |
| 4,941,723 | 7/1990 | Sasada | 385/147 |
| 4,954,931 | 9/1990 | Hassler, Jr. | 362/32 |
| 4,961,617 | 10/1990 | Shahidi et al. | 385/901 |
| 4,996,632 | 2/1991 | Aikens | 385/147 |
| 5,012,346 | 4/1991 | DeJager et al. | 358/214 |

FOREIGN PATENT DOCUMENTS

| | | | |
|---|---|---|---|
| 62-275247 | 5/1989 | Japan | 385/147 X |
| 62-302547 | 6/1989 | Japan | 385/147 X |

OTHER PUBLICATIONS

Milch, James R., "Line Illumination System and Detector for Film Digitization," *SPIE*, vol. 1242, Charge-Coupled Devices and Solid State Optical Sensors (1990), pp. 66-77.

Kurtz, Andrew F. and Kessler, David, "Optical Scanning System for a CCD Telecine for HDTV," *SPIE*, vol. 1448, Camera and Input Scanner Systems (1991), pp. 191-205.

Kaplan, Martin C., "Monte Carlo Calculation of Light Distribution of an Integrating Cavity Illuminator," *SPIE*, vol. 1448, Camera and Input Scanner Systems (1991), pp. 206-217.

*Primary Examiner*—Brian Healy
*Attorney, Agent, or Firm*—David M. Woods

[57] ABSTRACT

An improved linear light source or light collector for a film scanner comprising an elongated, solid, light integrating, light conducting rod having an axial port at one end thereof through which a light beam is introduced into or directed out of the rod and an output/input strip extending generally parallel to its longitudinal axis. The rod preferably comprises a core of transparent glass having a first index of refraction with a cladding layer covering the core, except in a first elongated strip, of a glass having a second index of refraction. A coating of diffusely reflective paint is applied over the cladding and the first elongated strip, except in a second elongated strip (which defines the output/input strip), wherein the first and second elongated strips do not overlap one another. When used as a linear light source, light directed axially into the port propagates axially down the core by internal reflection off the cladding/core interface, but is diffusely scattered at the coating/core interface of the first elongated strip and again scattered at the coating/cladding interface until the scattered light escapes through the output strip to provide a line of diffusely scattered light. The illumination profile (variation of illumination along the length of the output strip) can be custom tailored, rather than simply being uniform, by controlling the area and location of the portion(s) of the cladding that is disrupted to form the first elongated strip. For example, it can be designed to provide more light at the ends of the strip than at the center. When used as a linear light collector, light is directed at the elongated strip and, through internal reflection, is reflected in the reverse direction to the axial end port and a photodetector to detect the instantaneous intensity of the light beam entering the input strip.

37 Claims, 2 Drawing Sheets

LINEAR COATED CORE/CLAD LIGHT SOURCE/COLLECTOR

BACKGROUND OF THE INVENTION

1. Field of the Invention

The present invention relates to a linear light source/collector, and more particularly, to such a light source/collector for use in film scanners.

2. Description of the Prior Art

In film digitizers, linear light sources and collectors have been frequently employed. A telecine film scanner typically includes a linear CCD image sensor which provides a serial output of signals representing successive lines of an image illuminated by a linear light source. For color applications, the film scanner can include an assembly of three separate CCD image sensors, one for each of the primary colors. The film is driven at a uniform rate past a linear light source, and an illuminated line of the film is imaged onto each CCD image sensor. The film motion provides the frame scan, and the linear cycling of the elements in the image sensor provides the line scan. A scanner of this type is disclosed in U.S. Pat. No. 4,205,337.

The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g., scratches, will appear in an image produced from the scanned information.

An improved type of illumination system is disclosed in U.S. Pat. No. 4,868,383, which is assigned to the assignee of the present invention. This patent discloses a linear light source for a film scanner which includes means for generating an intense beam of light and an elongated cylindrical integrating cavity having diffusely reflective walls. The intense beam is introduced into the cavity through an input port, and a uniform line of light is emitted through an output slit which extends parallel to the longitudinal axis of the cylindrical integrating cavity. Such a light source produces a line of diffuse light which has a uniform linear and angular distribution, and excellent results can be obtained over a wide range of operating conditions. There is a need, however, in certain types of scanners for a linear light source in which the linear distribution issuing from such a light source can be very closely controlled in order to control the intensity of the light on a receiving medium.

Other considerations taken into account in the design of telecine scanners and linear light sources are set forth in the articles: J. R. Milch, "Line Illumination System and Detector for Film Digitization," *SPIE Proc.*, Vol. 1242, pp. 66–77, February 1990; M. Kaplan, "Monte Carlo Calculation of Light Distribution in an Integrating Cavity Illuminator," *SPIE Proc.*, Vol. 1448, pp. 206–217, February 1991; and A. F. Kurtz and David Kessler, "Optical Scanning System for a CCD Telecine for HDTV," *SPIE Proc.*, Vol. 1448, pp. 191–205, February 1991.

These light integration cylinders are also used in the inverse fashion to collect light entering the elongated slit in the cylinder wall and present it to a photodetector positioned at an exit port as depicted in FIG. 4 of the above referenced Kaplan article. In this context the slit of the integrating cylinder is oriented to receive light transmitted through (or reflected by) an image leaving medium, e.g. radiographic film, that is scanned linearly by a laser beam. In such scanners the images, recorded in the form of variations in the film density or opacity, are scanned repeatedly with the laser light beam and the transmitted (or reflected) intensity of the beam is continuously read out by the photodetector. The integrating cylinder thus acts to collect the light of the beam entering the slit and direct it to the photodetector. In this context it is important that the integrating cylinder light collector does not, through its design, accentuate or alter the image modulated intensity of the light at the port depending on where it enters the slit.

In the design of such linear light sources and collectors, it has been proposed to employ a light pipe or glass rod positioned within the integrating cylinder and extending parallel to the exit slit in the cylinder wall to distribute light from a light source to the cylinder or to collect light from the cylinder and direct it to the photodetector. Japanese Laid Open Patent Publication Nos. 1-116630 (Application No. 62-275247) 1-143937 (Application No. 62-143937) disclosed such an arrangement where the light pipe has a stripe of barium sulfate to a given width and in the lengthwise direction to form a light scattering band. Light entering one end of the light pipe is scattered, by striking the stripe, into the cylinder and scattered until it exits the elongated stripe. Conversely, light may be collected that enters the slit and directed out the end of the light pipe.

Despite these improvements made in integrating cylinder linear light sources and collectors, difficulties remain in achieving efficiency and uniformity in light intensity emitted or detected along the length of the slit.

The current technology has several limitations which are addressed by the present invention. Integrating cylinders are inefficient, typically wasting 70–90% of the light entering the entry hole. The ideal output profile has somewhat more light at the ends than at the center of the slit, but the current cylinders tend toward the converse, and customizing the profile is difficult or impossible. The source lamp may need to be carefully aligned with respect to the entry hole to produce near optimum results.

As described in certain of the referenced patents, it has also been proposed to provide an integrating cylinder with the entry hole in an end face, rather than on the side of the cylinder. The primary advantage of an end hole is that it mechanically fits better into some scanner systems. A great disadvantage is that the source lamp must be carefully aligned with respect to the cavity. Also, the uniformity of light diffusion in the cavity with the end face entry hole is usually worse than the side entry hole.

SUMMARY OF THE INVENTION

It is an object of the present invention to overcome the problems in the prior art discussed above and to provide an improved and simplified linear light source or collector for a film scanner.

In accordance with one aspect of the present invention, there is provided a linear light source/collector comprising an elongated, solid, light integrating rod having first and second ends and having an internal reflecting surface strip and a light trapping coating, a port formed at one end thereof through which a light beam may exit or be introduced into the solid integrating rod and an elongated strip generally parallel to a longitudinal axis of the light integrating rod.

In one embodiment of the present invention, when used as a linear light source, the elongated light integrating rod has a port at one end thereof and a light emitting output strip extending along the length thereof for emitting light entering the input port in a line, the beam being introduced into the integrating means such that the beam is confined by total internal reflection except when the light undergoes at least one diffuse reflection from the diffusely reflective region before exiting the output strip. Preferably, the light integrating rod comprises a core of transparent light conductive material having a first index of refraction, a cladding layer covering the core, except in a first elongated strip, of a material having a second index of refraction, and a coating of diffusely reflective material over the cladding and the first elongated strip, except in a second elongated strip, wherein the first and second elongated strips do not overlap one another. The linear light source preferably includes means for directing the beam of light axially into the input port, whereby the light propagates axially down the core by internal reflection off the cladding/core interface, but is diffusely scattered at the coating/core interface of the first elongated strip and scattered again at the coating/cladding interface until the scattered light escapes through the second elongated strip to provide a line of diffusely scattered light.

A principal advantage of the disclosed linear light source is that it can produce a bright line of light in which the linear intensity profile can be closely controlled. As a result of being able to closely control the linear intensity profile, the light source has increased brightness over a desired linear range.

The illumination profile (variation of illumination along the length of the output strip) can also be custom tailored, rather than simply being uniform, by controlling the area and location of the portion(s) of the cladding that is disrupted. For example, it can be designed to provide more light at the ends of the output strip than at the center.

Efficiency can also be improved by tapering the entry/exit port, and placing a mirror at the other end to reflect light back reaching that end.

When used as a collector, the elongated rod, configured as above, operates in the inverse fashion to direct a scanning beam traversing the elongated strip toward the end port and a photodetector positioned there.

The inventive linear light source/collector is advantageously much more compact than a conventional integrating cylinder, having a much smaller diameter. Moreover, it is more efficient than a conventional integrating cylinder, because its smaller diameter means there is a smaller area of white paint (thereby reducing absorption), because less light is wasted by being output at undesirable angles, and because less light is scattered back out the entry face. It is also more durable and easier to keep clean than the above-referenced hollow integrating light cavities.

The configuration permits the light source or photodetector to be oriented to the end port, which is often more accessible than the side illumination common in integrating cylinders.

The compact glass rod integrating cylinder thus serves to replace more conventional integrating cylinders to detect a scanning light beam or to produce a stripe of diffuse, nearly uniform illumination. Custom tailoring of the spatial profile of the output light or the detection characteristics can be accomplished by varying the first elongated strip. In particular, it permits a source that emits more light or a collector that is more responsive to light at the ends of the elongated strip than in the center, which is often the most desirable profile. Integrating cylinders generally attempt to achieve only a uniform profile, and they generally do worse than that.

BRIEF DESCRIPTION OF THE DRAWINGS

Other features and advantages will become apparent upon reference to the following description of the preferred embodiments when read in light of the attached drawings where like elements are denoted by like numerals and wherein.

The drawings are not necessarily to scale.

DESCRIPTION OF THE PREFERRED EMBODIMENTS

As currently used in many film scanners, integrating cylinders introduce light at a port in the cylinder wall, and then the light multiply reflects within the cylinder to randomize the light distribution. This randomization produces uniform, diffuse light within the cylinder, which then exits through a long, narrow exit slit to produce a stripe of uniform, diffuse illumination when used as a linear light source, or through the port, when used as a linear light collector.

Figure 1:
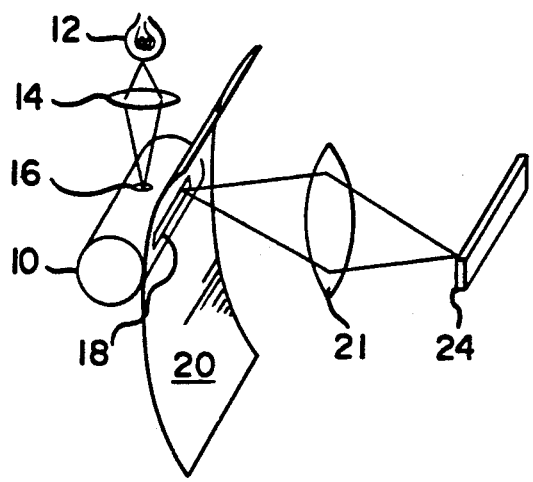
FIG. 1 is a perspective view showing a prior art linear light source employed as a film scanner.

FIG. 1 depicts a typical example of a prior art film scanner integrating cylinder 10 used as a linear light source. A lamp light source 12 is focused by a lens 14 into the entry hole 16 of a hollow cylinder 10. The cylinder 10 has parallel end walls and a diffuse, white interior, which multiply reflects the light. The light then leaves the cylinder 10 through a relatively long, narrow exit slit 18, illuminating the nearly film 20. This illuminated stripe of film 20 is then imaged through a lens system 22 onto a linear sensor 24, such as a CCD array. By moving the film 20 vertically past the exit slit 18, a full image frame on the film 20 can be scanned.

Figure 2:
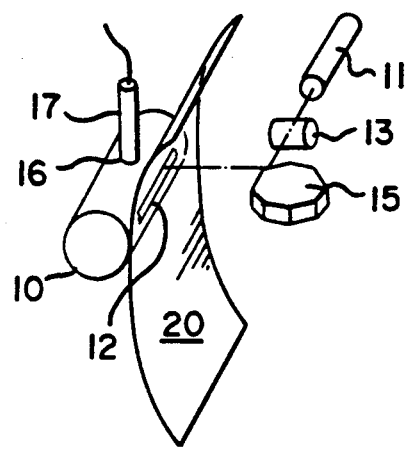
FIG. 2 is a perspective view showing a prior art linear light collector employed as a scanning light beam detector in a further film scanner.

FIG. 2 illustrates the use of an integrating cavity 10 as a linear light collector used to collect a laser light beam passing through and modulated by the density of image on the film 20. Such film scanners are typically used to scan radiographic images recorded by X-ray or the like on transparencies in order to provide a digital record for storage, transmission to remote locations and to conduct image enhancement and analysis.

In FIG. 2 the laser light source 11 is imaged by a lens system 13 onto the facets of a rotating mirror 15 which deflects the beam in a scanning line onto the film 20. The scanned beam transverses the film 20, and light transmitted through the film 20 enters the slit 18 of the integrating cylinder 10. The cylinder 10, constructed as described above, reflects the light internally until it is picked up by a photodetector 17 positioned at port 16. Thus the light integrating cylinder or cavity used as a light collector functions inversely to its use as a linear light source. In order to simplify the remaining description of the preferred embodiments, it will be directed to the use of the inventive features and construction in the context of a linear light source of FIG. 1, although it will be understood that the description applies as well to its use as a linear light collector of FIG. 2, except as may be noted.

The present invention replaces the current large diameter, air filled, integrating cylinder 10 used in the scanners of FIGS. 1 and 2 by a relatively smaller diameter, glass (or other transparent material) filled integrating cylinder 11 depicted in FIGS. 3-6. In the linear light source context illustrated in FIG. 3, this structure acts like a fiber optic light pipe, permitting light to be introduced at one end 26, and then confining the light within the glass by total internal reflection (TIR). A portion of the cladding is disrupted to violate the TIR conditions. The surface is then painted white, effectively making the entire structure interior to the white paint coating into a cylindrical integrating cavity. A portion of the white paint is removed, forming a long, narrow strip or slit 19 for some of the light to leak out. This leaking light provides a stripe of uniform, diffuse illumination, for use in a linear light source scanner. Conversely, when used as a linear light collector, light entering strip 19 is scattered until it exits port 26 to impinge on a photodetector.

Figure 4:
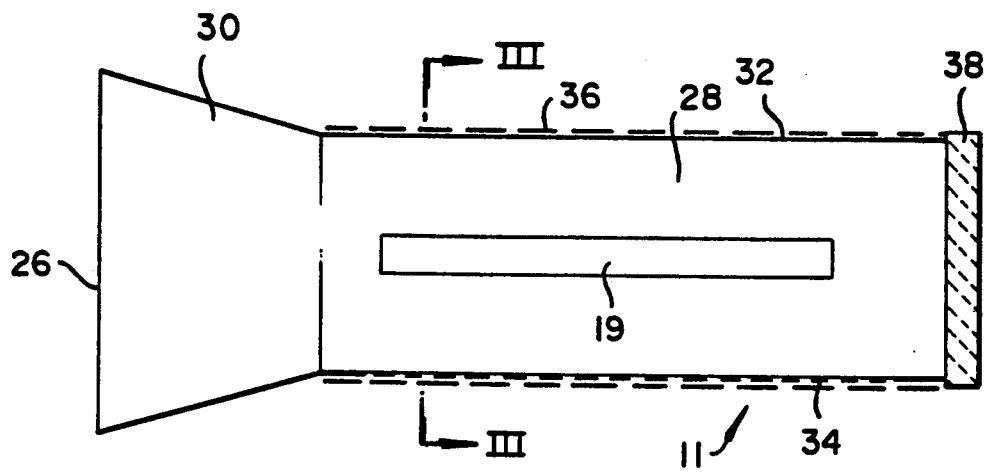
FIG. 4 is a side elevation view of a compact glass rod integrating cylinder of the present invention.
Figure 5:
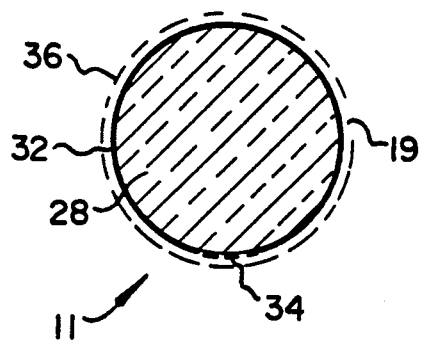
FIG. 5 is a cross-section view taken along the line III—III in FIG. 4.
Figure 6:
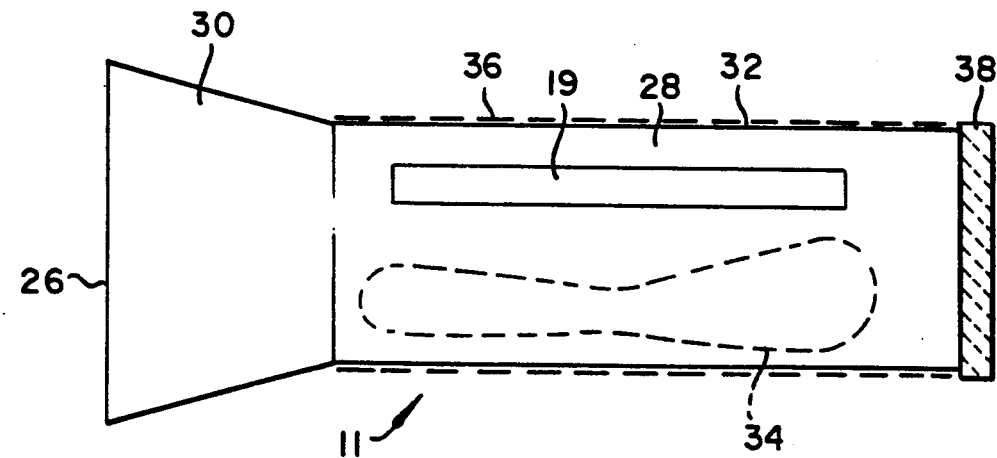
FIG. 6 is a side elevation view of the integrating cylinder depicting intensity control of light emitted along the length of the cylinder by modulating the pattern of the first elongated strip.

FIGS. 4-6 show the internal configuration of the preferred embodiment of the compact glass rod integrating cylinder 11. A long, cylindrical rod 28 of glass, having high index of refraction, and a tapered port 30 forms the core. A thin cladding layer 32 of glass, having a different, preferably lower, index of refraction than the core glass, surrounds the core 28. A first elongated strip 34 of cladding layer 32 is missing. (Cladding 32 can be removed by abrasion or other processing, or never deposited on the core 28.) The entire surface is then painted white, including filling in the missing cladding layer 32 at strip 34, with a white paint coating 36 (so that the paint touches the core 28 where the cladding is missing.) An elongated, narrow strip 19 of the white paint coating 36 is removed (or never deposited), forming a second, linear light emitting or collecting strip (replacing the exit slit of the prior art). A mirror 38 is placed at the narrow, far end of the glass rod 28 to enhance total internal reflection of light.

There are several minor variations on the structure. For example, it is not necessary to have a cladding layer 32 where there is no white paint coating 36, e.g., at the face 26 and along the tapered surface of the tapered port 30. Conversely, it is permissible to provide the paint coating 36 over the surface of the tapered port 30 if the cladding layer 32 is present there. The cylinder 11 will generally be longer and narrower than shown, since it is drawn with a lower aspect ratio for ease of illustration.

The solid glass rod integrating cylinder 11 functions as a linear light source as follows. Light from the lamp source and lens 12, 14 shines onto the large end 26 or entry port of the core 28. Light is trapped inside the core 28 by total internal reflection (TIR) at the core/cladding interface, and propagates down its length to the mirror 38. The tapered port 30 concentrates the incoming light to the smaller diameter of the main body of the elongated core 28. As the light propagates down the core 28, some light encounters the white paint coating at strip 34 where the cladding layer 32 is missing, and that light scatters diffusely. Some of this scattered light remains within the critical angle, and thus remains trapped by TIR and continues to propagate down the rod (or perhaps propagates backward, toward end 26). However, some of the scattered light exceeds the critical angle, violating the conditions for TIR, and can escape from the core 28 and propagate through the cladding layer 32.

At the outside of the cladding layer 32, the light encounters the white paint coating 36, which scatters it diffusely back into the cladding layer 32. This light propagates within the cladding and core glass, but will not be trapped within the core by TIR, because Snell's law of optics dictates that light entering the core 28 from outside will exceed the critical angle just inside the core. Thus, this untrapped light will pass back and forth through the cladding layer 32 and core 28 until it again strikes the white paint coating 36. It will undergo multiple reflections from the white paint coating 36 until it happens to encounter the unpainted exit strip 19, whereupon the light will escape from the rod, through the exit strip 19, providing a linear source of diffuse light to the rest of the film scanner system.

It should be noted that a small fraction of the untrapped light can accidentally encounter the elongated strip 34 of missing cladding, where it will be scattered diffusely by the white paint coating 36 on the core surface, and a minor portion of this light again will become trapped.

The mirror 38 serves to improve the efficiency of light diffusion. Some of the trapped light propagating down the core 28 from the entry port will reach the end of the rod. Rather than waste it, the mirror 38 reflects it back into the core 28, where it remains trapped by TIR and propagates backward. Once again, some of this light scatters from the region 34 of removed cladding. In a typical design, 10%-50% of the light will reach the mirror 38, where it will be reflected back (with 90%-100% efficiency) and make a second pass through the core 28. Typically, less than 25% of the original light will propagate all the way back to the tapered end 38, where it will escape from the face 26 and be wasted.

In many applications, it is desirable for the strip 19 to be of uniform width, thereby providing an illuminated stripe of uniform width. However, it is often desirable for the intensity or brightness to be non-uniform, with many applications preferring that the brightness be higher at the ends of the slit 19 than at the center. By tailoring the width of the region or strip 34 of missing cladding, it is possible to achieve such a brightness profile, as well as many other possible profiles. FIG. 6 shows a varying width strip 34 having a wider section of cladding removed toward each end of the core 28, with a narrower section removed in the center. This causes a larger fraction of the light propagating down the core 28 to scatter near the ends than near the center. Suitably selecting the variation in width of the removed cladding allows tailoring of intensity or brightness profile at the exit strip. Usually, the strip 34 of missing cladding will be somewhat narrower approaching the end 30 than at the opposite end, because light levels in the core 28 are higher near the lamp source 12, 14, and more depleted near the mirror 38.

The linear profile of light along the length of the exit strip can also be controlled by duty cycle modulation of the diffusely reflecting strip 34, instead of (or in addition to) width modulation. Such duty cycle modulation would appear as patches of removed cladding layer 28 extending lengthwise along core 28 in the region of strip 34 illustrated in FIGS. 3-5.

The relative position or distance apart radially of the strip 34 of missing cladding and the exit strip 19 of missing white paint is another parameter that can be adjusted to suit a particular application.

FIGS. 4 and 5 show them located about 90° apart from the circular cross section of the cylinder 11, and of approximately the same length. Light which passes directly from the strip 34 of removed cladding to the exit strip 19, without multiple scattering off the white paint coating 36, will tend to produce a peak in the angular profile of the output light.

For applications requiring very diffuse (Lambertian) light, it is thus desirable to have the two strips 19 and 34 less than 90° apart (as shown in FIG. 6), since the geometry reduces the amount of light that passes directly from the removed cladding strip 34 to the exit strip 19. For applications desiring a peak in the angular output, the strip 34 of removed cladding can be moved to a position of 180°, directly opposite the exit strip 19. For critical applications demanding very diffuse light with no angular peaks, it is better to have two strips 34 and 34' of removed cladding layer 32 (instead of just one), immediately adjacent either side of the exit strip 19.

Rather than removing the strip (or strips) 34 of cladding, the surface of the core 28 can be treated before the cladding 32 is deposited to make it scattering, by painting or depositing pigments (but these must not be destroyed during subsequent processing), by depositing other scattering materials (e.g., a layer of glass with small particles or voids), by roughening the core surface by abrading or scratching, or depositing small particles of core glass or other material which will scatter. After this, the cladding 32 can be deposited on the core 28 surface, including over the specially treated strip 34.

Other alternatives to removing a strip of cladding include: incorporating scattering centers (particles or voids) into the bulk of the core glass, with higher densities of scattering centers toward both ends of the rod. Alternatively, a gradient in the index of refraction of the core glass, which is highest near the lamp end of the rod, and decreases toward the far end can be created. As the gradient decreases, more of the light in the core will violate the TIR conditions and escape from the core.

The diameter of the core 28 could also be reduced either uniformly or non-uniformly from the near end to the far end, forming a tapered shape. Such a tapered shape concentrates the light in the core to smaller and smaller diameters as it propagates down the core. However, it is well known that there is a limit to this concentration (related to the area and divergence of the light falling onto the entry end of the rod) and, as the concentration begins to exceed the limit, light will leak out the sides of the rod to avoid exceeding the limit. As the diameter of the rod shrinks, more light leaks out.

It should be noted that the gradient index and the tapered core embodiments have the disadvantage of not being effective at scattering light from the core if the light is propagating in the backward direction (toward the lamp), and thus cannot use a mirror at the far end.

Figure 3:
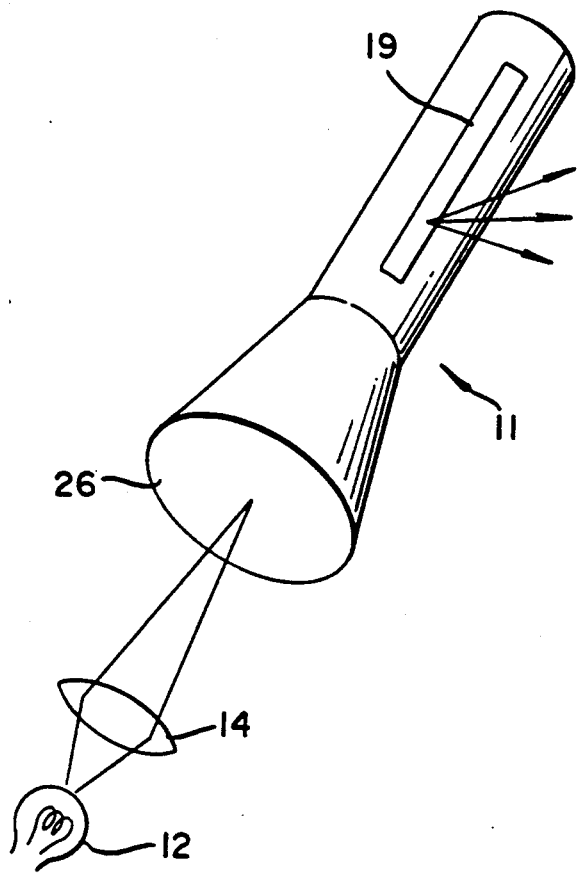
FIG. 3 is a perspective view of the linear light source of the present invention.

In a further modification of the embodiment of FIGS. 3-5, the mirror 38 may be replaced by a white surface placed slightly beyond the end of the core 28. The gap between the white surface and the core 28 should be larger than a few wave-lengths of light, and much smaller than the core diameter. The white surface can be more efficient than mirror 38, both because of higher reflectivity and because it re-diffuses the light, permitting better coupling to strip 34.

The white paint can also be replaced by alternatives, such as white plastic, or reflective colored materials if colored light is being used.

While the compact glass rod integrating cylinder has been described in one context of being used for linear light illumination in a film input scanner, it can also be used as a source of illumination in many other systems. Some modifications to the shape of the output light beam are also possible, e.g., by removing white paint in shapes other than long, narrow, rectangular strips, and by deforming the glass rod into other shapes. As described, it can also be used as a collector of light, rather than as a source of light, e.g., by allowing light to enter the strip 19 and placing a photodetector at the end face 26 of the rod 28.

The invention has been described in detail with particular reference to the preferred embodiment thereof, but it will be understood that variations and modifications can be effected within the spirit and scope of the invention.

What is claimed is:

1. A solid, linear, light integrator of the type comprising elongated light integrating means having a port at one end thereof and a light exiting or entrance strip extending along the length thereof for emitting light entering the end port in a line, or admitting light for reflection through the port, the light integrating means further comprising:
   a core of transparent light conductive material having a first index of refraction;
   a cladding layer covering the core, except in a first elongated strip extending longitudinally and parallel with the axis of the core, of a material having a second index of refraction; and
   a coating of diffusely reflective material over the cladding and the first elongated strip and on the end port, except in a second elongated strip extending longitudinally and parallel with the axis of the core, wherein the first and second elongated strips do not overlap one another and are radially displaced from one another and with respect to the axis of the core sufficiently that light entering the second elongated strip and passing through the axis of the core does not directly impinge on the first elongated strip, or light reflected by the coating of diffusely reflective material over the first elongated strip and passing through the axis of the core does not directly exit through the second elongated strip,
   whereby light propagates axially down the core by internal reflection off the cladding/core interface, but is diffusely scattered at the coating/core interface of the first elongated strip and at the coating/cladding interface so that light admitted at the end port is scattered and the scattered light escapes through the second elongated strip to provide a line of diffusely scattered light or light admitted through the second elongated strip is collected and directed through the end port.

2. The linear light integrator of claim 1 configured as a light source wherein:
said second elongated strip provides a linear exit port for light entering the end port and scattered within the light integrating means; and
said first elongated strip is displaced radially from the second elongated strip in order to control the amount of light scattered directly from the first elongated strip to the linear exit port.

3. The linear light source of claim 2 wherein the radial displacement is less than 90°.

4. The linear light integrator of claim 2 wherein the first elongated strip has a relatively narrow width with respect to its length and wherein the width is varied along the length to lengthwise control the intensity of scattered light exiting the linear exit port.

5. The linear light integrator of claim 4 wherein the first elongated strip is wider nearer at least one end of the core than midway along its length.

6. The linear light integrator of claim 2 wherein the angle of displacement of the first and second elongated strips is decreased in order to increase the diffuseness of the light exiting the linear exit port.

7. The linear light integrator of claim 2 further comprising a third elongated strip extending lengthwise in the cladding and exposing the core and wherein:
the third elongated strip is covered by the reflective coating; and
the second elongated strip in the coating is situated between the first and third elongated strips for providing highly diffusive light exiting the exit port.

8. The linear light integrator of claim 2 wherein the elongated light integrating means is generally cylindrical in cross-section and has a reflective mirror positioned at the other end thereof for reflecting light propagated axially down the core back toward the end port.

9. The linear light integrator of claim 1 wherein the elongated light integrating means is generally cylindrical in cross-section and has a reflective mirror positioned at the other end thereof for reflecting light propagated axially down the core back toward the end port.

10. The linear light integrator of claim 1 wherein the first elongated strip has a relatively narrow width with respect to its length and wherein the width is varied along the length to lengthwise control the intensity of scattered light along and within the core.

11. The linear light integrator of claim 10 wherein the first elongated strip is wider nearer at least one end of the core than midway along its length.

12. The linear light integrator of claim 1 wherein the first elongated strip comprises an elongated pattern of non-continuous openings in the cladding layer where cladding does not cover the core, the pattern modulated to lengthwise control the intensity of scattered light exiting the linear exit port.

13. The linear light integrator of claim 1 wherein the elongated light integrating means is generally cylindrical in cross-section and has a diffuse light reflector positioned near, but not in contact with, the other end thereof for reflecting light propagated axially down the core back toward the end port.

14. The linear light integrator of claim 1 configured as a light collector wherein:
said second elongated strip provides a linear entry port for light directed therein; and
said first elongated strip is displaced radially from the second elongated strip in order to control the amount of light scattering of light entering the linear entry port depending on the point of entry along the entry port.

15. The linear light source of claim 14 wherein the radial displacement is less than 90°.

16. The linear light integrator of claim 14 wherein the first elongated strip has a relatively narrow width with respect to its length and wherein the width is varied along the length to lengthwise control the response to the intensity of light entering the linear entry port.

17. The linear light integrator of claim 16 wherein the first elongated strip is wider nearer at least one end of the core than midway along its length.

18. The linear light integrator of claim 14 wherein the angle of displacement of the first and second elongated strips is decreased in order to make the angular response of the end port more Lambertian.

19. The linear light integrator of claim 14 further comprising a third elongated strip extending lengthwise in the cladding and exposing the core and wherein:
the third elongated strip is covered by the reflective coating; and
the second elongated strip in the coating is situated between the first and third elongated strips.

20. The linear light integrator of claim 14 wherein the first elongated strip comprises an elongated pattern of non-continuous openings in the cladding layer where cladding does not cover the core, the pattern modulated to lengthwise control the response to the intensity of light entering the linear entry port.

21. The linear light integrator of claim 14 wherein the elongated light integrating means is generally cylindrical in cross-section and has a diffuse light reflector positioned near, but not in contact with, the other end thereof for reflecting light propagated axially down the core back toward the end port.

22. The linear light integrator of claim 14 wherein the elongated light integrating means is generally cylindrical in cross-section and has a reflective mirror positioned at the other end thereof for reflecting light propagated axially down the core back toward the end port.

23. A solid, linear, light integrator of the type comprising elongated light integrating means having a port at one end thereof and a light exiting or entrance strip extending along the length thereof for emitting light entering the end port in a line, or admitting light for reflection through the port, the light integrating means further comprising:
a core of transparent light conductive material having a first index of refraction and a generally polished surface except in a longitudinally extending pattern where the surface is treated to diffusely reflect light;
a cladding layer covering the surface of the core of a material having a second index of refraction; and
a coating of diffusely reflective material applied over the cladding layer and over the longitudinally extending pattern, except in an elongated strip extending longitudinally and parallel with the axis of the core and on the end port, wherein the longitudinally extending pattern and the elongated strip do not overlap one another and are radially displaced from one another and with respect to the axis of the core sufficiently that light entering the elongated strip, functioning as the light entrance strip, and passing through the axis of the core, does not directly impinge on the longitudinally extending pattern, or light reflected by the coating of diffusely reflective material over the longitudinally extending pattern does not pass through the axis of the core and directly exit through the elongated strip, operating as the exiting strip, whereby light propagates axially down the core by internal reflection off the cladding/core interface, but is diffusely scattered at the longitudinally extending pattern and thereafter at the coating/cladding interface, so that light admitted at the end port is scattered and the scattered light escapes through the elongated light exiting strip to provide a line of diffusely scattered light or light admitted through the elongated entrance strip is collected and directed through the end port.

24. The linear light integrator of claim 23 wherein the surface treatment of the core in the longitudinally extending pattern comprises abrasion, etching or coating with particles.

25. A solid, linear, light integrator of the type comprising elongated light integrating means having a port at one end thereof and a light exiting or entrance strip extending along the length thereof for emitting light entering the end port in a line, or admitting light for reflection through the port, the light integrating means further comprising:

an elongated core of transparent light conductive material having a first index of refraction and a generally polished surface and having a light scattering configuration formed therein in a longitudinally extending pattern;

a cladding layer covering the surface of the core of a material having a second index of refraction; and a coating of diffusely reflective material applied over the cladding layer and over the longitudinally extending pattern of the light scattering configuration formed in the core, except in an elongated light exiting or entrance strip extending longitudinally and parallel with the axis of the core, wherein the longitudinally extending pattern of the light scattering configuration is varied along the length of the core to tailor the light scattering characteristics within the core and the resultant brightness of light emitted through the light exiting strip along its longitudinal dimension or collected through the light entrance strip along its longitudinal dimension, whereby light propagates axially down the core by internal reflection off the cladding/core interface, but is diffusely scattered at the longitudinally extending pattern and thereafter at the coating/cladding interface, so that light admitted at the end port is scattered and the scattered light escapes through the elongated strip to provide a line of diffusely scattered light or light admitted through the elongated strip is collected and escapes through the end port.

26. The linear light integrator of claim 25 wherein the configuration of the core to selectively scatter light comprises means incorporated into the light conductive material of the core for scattering light at an angle exceeding the angle of total internal reflection.

27. The linear light integrator of claim 26 wherein the light scattering means comprise voids or scattering particles selectively distributed lengthwise in the light conductive material.

28. The linear light integrator of claim 25 wherein the configuration of the clad core to selectively scatter light is effected by changing the index of refraction of the core or cladding layer along the length of the clad core.

29. The linear light integrator of claim 25 wherein the configuration of the clad core to selectively scatter light comprises a tapered clad core with a diameter which is reduced from a point near the entry port to a point at or near the other end of the clad core.

30. The linear light integrator of claim 1 further comprising a third elongated strip extending lengthwise in the cladding and exposing the core and wherein:

the third elongated strip is covered by the reflective coating; and the second elongated strip in the coating is situated between the first and third elongated strips.

31. A solid, linear, light integrator of the type comprising elongated light integrating means having a port at one end thereof and a light exiting or entrance strip extending along the length thereof for emitting light entering the end port in a line, or admitting light for reflection through the port, the light integrating means further comprising:

an elongated core of transparent light conductive material having a first index of refraction and a generally polished surface;

a cladding layer covering the surface of the core of a material having a second index of refraction except in a longitudinally extending pattern varying in shape along the length of the core and forming a first elongated strip; and a coating of diffusely reflective material applied over the cladding layer and over the longitudinally extending pattern of the first elongated strip, except in a second elongated light exiting or entrance strip extending longitudinally and parallel with the axis of the core, wherein the longitudinally extending pattern of the first elongated strip covered by the diffusively reflective material functions as a light scattering configuration that is varied along the length of the core to tailor the light scattering characteristics within the core and the resultant brightness of light emitted through the light exiting strip along its longitudinal dimension or collected through the light entrance strip along its longitudinal dimension, whereby light propagates axially down the core by internal reflection off the cladding/core interface, but is diffusely scattered at the longitudinally extending pattern and thereafter at the coating/cladding interface, so that light admitted at the end port is scattered and the scattered light escapes through the elongated strip to provide a line of diffusely scattered light or light admitted through the elongated strip is collected and escapes through the end port.

32. The linear light integrator of claim 31 wherein the first elongated strip comprises a pattern of non-continuous openings in the cladding layer exposing the core and covered by the diffusively reflective coating, the pattern modulated to lengthwise control the brightness of light emitted from the light exiting strip or to lengthwise control the response to the brightness of light entering the light entrance strip and directed to the end port.

33. The linear light integrator of claim 31 wherein the first elongated strip comprises a continuous opening in the cladding layer exposing the core and covered by the diffusively reflective coating, the opening varying in width to lengthwise control the brightness of light emitted from the light exiting strip or to lengthwise control the response to the brightness of light entering the light entrance strip and directed to the end port.

34. A solid, linear, light integrator of the type comprising elongated light integrating means having a port at one end thereof and a light exiting or entrance strip extending along the length thereof for emitting light entering the end port in a line, or admitting light for reflection through the port, the light integrating means further comprising:
- an elongated core of transparent light conductive material having a first index of refraction and a generally polished surface except in a longitudinally extending pattern varying in shape along the length of the core and forming a first elongated strip, wherein the generally polished surface is treated to diffusively reflect light;
- a cladding layer covering the surface of the core including the first elongated strip of a material having a second index of refraction; and
- a coating of diffusely reflective material applied over the cladding layer and over the longitudinally extending pattern of the first elongated strip, except in a second elongated light exiting or entrance strip extending longitudinally and parallel with the axis of the core,
- wherein the longitudinally extending pattern of the first elongated strip covered by the diffusively reflective material functions as a light scattering configuration that is varied along the length of the core to tailor the light scattering characteristics within the core and the resultant brightness of light emitted through the light exiting strip along its longitudinal dimension or collected through the light entrance strip along its longitudinal dimension,
- whereby light propagates axially down the core by internal reflection off the cladding/core interface, but is diffusely scattered at the longitudinally extending pattern and thereafter at the coating/cladding interface, so that light admitted at the end port is scattered and the scattered light escapes through the elongated strip to provide a line of diffusely scattered light or light admitted through the elongated strip is collected and escapes through the end port.

35. The linear light integrator of claim 34 wherein the first elongated strip comprises a pattern of non-continuous surface treatments of the core surface, the pattern modulated to lengthwise control the brightness of light emitted from the light exiting strip or to lengthwise control the response to the brightness of light entering the light entrance strip and directed to the end port.

36. The linear light integrator of claim 34 wherein the first elongated strip comprises a continuous surface treatment of the core surface varying in width to lengthwise control the brightness of light emitted from the light exiting strip or to lengthwise control the response to the brightness of light entering the light entrance strip and directed to the end port.

37. The linear light integrator of claim 34 wherein the surface treatment of the core comprises abrasion, etching or coating with particles.

* * * * *